United States Patent [19]

Baltz et al.

[11] 4,041,126

[45] Aug. 9, 1977

[54] SEPARATION AND SELECTIVE RECOVERY OF PLATINUM AND PALLADIUM BY SOLVENT EXTRACTION

[75] Inventors: John Baltz, Lakewood; Enzo Coltrinari, Arvada, both of Colo.

[73] Assignee: PGP Industries, Inc., Santa Fe Springs, Calif.

[21] Appl. No.: 642,146

[22] Filed: Dec. 18, 1975

[51] Int. Cl.$^2$ ............................................. C01G 55/00
[52] U.S. Cl. .............................. 423/22; 75/101 BE; 423/658.5; 423/DIG. 14
[58] Field of Search ................. 423/22, 658.5, 659 C; 75/101 BE

[56] References Cited

U.S. PATENT DOCUMENTS

| 3,437,431 | 4/1969 | Platz et al. | 423/22 |
|---|---|---|---|
| 3,558,288 | 1/1971 | Burrows | 75/101 BE |
| 3,666,446 | 5/1972 | Cook et al. | 75/101 BE |
| 3,812,232 | 5/1974 | Bauer et al. | 423/22 |
| 3,960,549 | 6/1976 | MacGregor | 75/101 BE |
| 3,979,207 | 9/1976 | MacGregor | 423/22 |
| 3,985,552 | 10/1976 | Edwards | 75/101 BE |

FOREIGN PATENT DOCUMENTS

| 1,057,078 | 5/1959 | Germany | 423/22 |
|---|---|---|---|
| 142,768 | 11/1961 | U.S.S.R. | 423/22 |

OTHER PUBLICATIONS

Borbat et al., "Chemical Absts.," vol. 65, 1966, No. 11423(c).
Dalgikh et al., "Chemical Absts.," vol. 65, 1966, No. 11423(e).
Neikova et al., "Chemical Absts.," vol. 80, 1974, No. 11087e.
Shulman et al., "Chemical Absts.," vol. 77, 1972, No. 80034s.

*Primary Examiner*—Herbert T. Carter
*Attorney, Agent, or Firm*—Darby & Darby

[57] ABSTRACT

A process for the separation and selective recovery of platinum and palladium values from an acidic aqueous medium which comprises contacting the medium with a mixed organic extraction reagent comprising a water immiscible organic solvent having dissolved therein an organically substituted secondary amine compound capable of forming complexes of platinum and palladium that are preferentially soluble in the organic solvent and whereby the contacting results in creation of an organic extract phase and an aqueous raffinate phase. After phase separation, palladium is selectively recovered by contacting the organic phase with an aqueous solution of an acidified reducing agent. Platinum is separately recovered by contacting the organic phase with an aqueous alkaline solution. The process may be employed as a method for concentrating solutions of platinum or palladium.

14 Claims, No Drawings

SEPARATION AND SELECTIVE RECOVERY OF PLATINUM AND PALLADIUM BY SOLVENT EXTRACTION

This invention pertains to a process for the separation and selective recovery of platinum and palladium from aqueous acidic solutions. More specifically, the invention pertains to the separation and selective recovery of platinum and palladium from aqueous hydrochloric acid solutions.

The conventional procedures for separation of platinum and palladium values from aqueous leach liquors resulting from ore concentration are tedious and require expensive apparatus. Since these techniques often call for the stepwise treatment of each batch of pregnant liquor in sequence, they are generally unsuitable for operation on a continuous flow basis. A further drawback of the aforementioned procedures is that they frequently require lengthy treatment periods to separate and recover platinum and palladium values from the acidic solutions in which they are dissolved along with other platinum group metals such as rhodium, iridium and ruthenium. This tends to increase the already high cost of these metals.

While the use of tertiary and quaternary amine extractants to win platinum and palladium values from solution is discussed in S. African Pat. No. 72/0308, a fairly lengthy and complex technique is required to strip the extracted metal values.

It is accordingly an object of the present invention to provide a process for the selective recovery of platinum and palladium from an aqueous acidic medium by means of a simple liquid-liquid extraction process.

A further object of the present invention is a process for the separation of platinum and palladium from an aqueous hydrochloric acid solution by coextracting the metals into a mixed organic phase containing an organically substituted secondary amine compound and selectively recovering platinum and palladium from the organic phase.

Another object of the present invention is provision of a process for increasing the concentration of platinum or palladium in aqueous solutions.

Further objects and advantages of the present invention will be understood with reference to the following description of the process.

According to the present invention, platinum and palladium are selectively recovered from an aqueous acidic medium in which they are dissolved by contacting the aqueous medium with a mixed organic extraction reagent. The mixed organic reagent comprises a water immiscible organic solvent in which is dissolved an organically substituted secondary amine compound having a solubility of at least 1% by weight in the organic solvent and capable of forming a complex with platinum and palladium that is preferentially soluble in the organic solvent. The contacting step results in the formation of an aqueous raffinate phase and an organic extract phase containing the complexed metals. Following phase disengagement the aqueous and organic phases are segregated or separated from one another. Palladium is recovered by contacting the organic phase with an aqueous solution containing an acidified reducing agent. Platinum recovery is effected by contacting the organic phase with an aqueous alkaline solution.

The secondary amine compounds capable of functioning as the extractant in the present invention have the general formula:

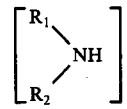

wherein $R_1$ and $R_2$ are hydrocarbons and $R_1$ is a straight or branched fatty alkyl group ($C_8$ through $C_{30}$); and $R_2$ is alkyl, aryl or fatty alkyl ($C_8$ through $C_{30}$), and $R_1$ plus $R_2$ contain between 18 and 35 carbon atoms. The term aliphatic includes branched chain radicals and alkyl or aryl substituted radicals. The term aryl includes alkyl substituted aryl radicals. The organically substituted ammonium compounds useful as extractants in the present invention form complexes with each of the desired metals (i.e., platinum and palladium) which complexes are soluble in at least one of the organic solvents set forth below, permit ready disengagement of the raffinate and extract phases after the extraction, and have a solubility of at least 1% by weight in the hydrocarbon solvent of the organic phase. Additionally, the substituted ammonium compound must be insoluble in water. Amberlite LA-1, N-dodecenyltrialkylmethylamine (made by Rohm & Haas Co.) is an effective extractant preferred for use in the invention. Other secondary amines which are suitable for use as extractants in the present invention include di(2-propyl-4-methylpentyl)-amine, di-N-decylamine, dilauryl amine, bis(1-isobutyl-3,5-di-methylhexyl)-amine, N-benzyl heptadecylamine, N-benzyl-1-(3-ethylpentyl)-4-ethyloctylamine, N-lauryltrialkylmethylamine, di-tridecylamine ("tridecyl" equals mixture of 13 carbon alkyls from tetrapropylene), N-benzyl-(1-N-nonyl-N-decyl) amine, N-benzyl-(1-N-undecyllauryl) amine, di(1-N-heptyl-N-octyl) amine, N-(nonyl-N-decyl) lauryl amine, N-(1-N-undecyllauryl lauryl amine, and di(1-N-nonyl-N-decyl) amine.

The major constituent of the extraction organic phase is a water immiscible carrier solvent in which the organically substituted secondary amine extractant is dissolved to form the organic phase.

Conventional organic solvents including, for example, aliphatic hydrocarbons such as petroleum derived liquid hydrocarbons, either straight chain or branched chain, kerosene, and fuel oil are useful as the carrier solvent in the present invention. A wide variety of aromatic solvents and chlorinated aliphatic solvents may also be employed including, for example, benzene, toluene, xylene, carbon tetrachloride, perchloroethylene. The organic carrier solvent must be substantially water immiscible and capable of dissolving the organically substituted secondary amine extractant. Moreover, the solvent should not interfere with the extraction of the desired platinum and/or palladium metal values from acid solution by the organically substituted amine. The secondary amine constituent of the organic extractant mixture must have a solubility of at least about 1% by weight in the hydrocarbon solvent of the organic phase. Kerosene, available as AMSCO 175 from the American Mineral Spirits Co., is the preferred solvent.

A phase modifier is usually admixed with the carrier solvent and the extractant to increase the solubility of platinum and palladium and help prevent the formation of a third phase during extraction and when platinum and palladium are stripped from the metal laden organic extract phase. Water insoluble straight or branched chain aliphatic alcohols containing at least 6 carbon atoms in the hydrocarbon chain may generally be used as phase modifiers. Examples of suitable phase modifiers include isodecanol which is preferred, 2-ethyl hexanol and tridecanol.

The aqueous phase from which platinum and palladium are extracted in the instant invention is ordinarily an aqueous mineral acid leach solution of the type normally resulting from the fusion and leaching of platinum metal ore concentrates. For purposes of illustration the invention will be further described by reference to separation and recovery of platinum and palladium from aqueous hydrochloric acid solutions since these are most commonly employed in the processing and recovery of platinum group metals. In aqueous acid chloride solutions, the soluble platinum and palladium compounds are generally present as complex chloro salts. Typically, such leach solutions range between about 0.1 to about 5 N HCl and up to about 250 grams per liter $Cl^-$ and higher. In addition to the platinum group metals (i.e., platinum, palladium, rhodium, ruthenium and iridium), the solutions may contain other base metal impurities such as lead, copper, bismuth, nickel, aluminum, silver, silica and barium. The aqueous acid solutions from which platinum and palladium are to be extracted should preferably be substantially free of gold and iron. Since these metals are frequently found in association with platinum and palladium they may be removed from solutions beforehand by conventional techniques well known in the art. To promote optimum separation of platinum and palladium during the extraction operation, the aqueous solution should preferably contain less than about 0.5 grams per liter of gold or iron.

It has been discovered that platinum and/or palladium can be effectively extracted from the foregoing aqueous hydrochloric acid solution in a conventional liquid-liquid extraction process employing the secondary amine organic extractant mixtures outlined above. In order to prevent simultaneous extraction of rhodium and iridium which are often present along with platinum and palladium, the aqueous leach liquors are reduced to an emf of between about $-425$ mv.* and about $-650$ mv., and preferably about $-525$ mv. prior to contacting the extraction organic. This is usually accomplished by the addition of a water soluble reducing agent, as for example, hydroquinone. In addition to preventing the extraction of rhodium and irridium, maintenance of the aqueous chloride solution in the reduced condition has been found to provide increased loading of the organic phase with platinum and palladium. In most instances the platinum and palladium extraction is carried out under acid conditions in which the pregnant leach solution is approximately pH 1, although the extraction will proceed satisfactorily with solutions up to about 2 N HCl or higher. Under the preceding conditions, platinum and palladium will ordinarily exist as anions.

* all measurements made with standard platinum saturated-calomel electrodes

Generally the organic extraction phase of the present invention will contain from about 1 to about 25 volume percent (%) of the secondary amine extractant, and from about 0.05 to about 15 volume percent (%) of the phase modifier diluted in carrier solvent. While the preceding criteria are generally applicable, the invention is not limited to operation within these boundaries. Based upon the maximum metal loading characteristics of a particular solvent, the metal bearing characteristics of the leach liquor to be extracted and the number of extraction stages to be employed, either the concentration of extractant and phase modifier in the solvent may be adjusted or the organic/aqueous (O/A) ratio for any particular extraction concentration may be varied to achieve a desired level of metal loading. In one effective version of the platinum/palladium extraction process of the instant invention, the organic phase used to extract platinum and palladium from the preferred pH 1 aqueous hydrochloric acid solution comprises 10 volume percent (%) Amberlite LA-1, 3 volume percent (%) isodecanol and 87 volume percent (%) kerosene. As a measure of economy, it is normally preferred to employ the lowest organic/aqueous ratio that will provide efficient separation for platinum and palladium values from an aqueous chloride solution. However, the most efficient organic to aqueous ratio for the extraction of platinum and palladium can be arrived at in accordance with procedures well known in the art.

The liquid-liquid extraction may be carried out by continuous counter-current, or batch processing procedures. As is well known in the liquid-liquid extraction art, greater separation may be achieved with multi-stage extraction processes. Typical apparatus for use in a multi-stage embodiment of the present invention could include, without necessarily being limited thereto, a multiple stage counter-current mixer — settler system in which the barren organic solvent and a pregnant aqueous stream are mixed together for a predetermined time period following which they are permitted to separate in a settling reservoir. The solvent and aqueous phase then flow in opposite directions to the next stage of contact.

Following extraction and separation of the organic extract phase and the aqueous raffinate, platinum and palladium may be selectively stripped by sequentially contacting the organic extract phase with an aqueous solution of an alkaline reagent (to strip platinum) and an aqueous acidified reducing reagent (to strip palladium). The preceding values need not be stripped from the loaded organic phase in any particular sequence, except in those instances described below where a chelating agent is used in conjunction with the alkaline stripping solution, in which case palladium is desirably stripped first.

The alkaline stripping reagent used in the present invention must be a water soluble compound which will convert the extracted values in the organic solvent into reaction products which are readily soluble in aqueous solution. Stripping efficiency (i.e., the ability to remove a large quantity of metal salts per unit volume of strippant) is an important criteria for selection of an alkaline stripping agent. Suitable alkaline stripping reagents include water soluble alkali and alkaline earth metal carbonates, bicarbonates and hydroxides, e.g., sodium and potassium hydroxide, carbonate or bicarbonate, although sodium bicarbonate ($NaHCO_3$) is preferably employed as the alkaline stripping reagent in most instances. The quantity of alkaline strippant required is at least the amount which will neutralize the acid salt (usually the chloride) form of the secondary amine organic and desirably includes in excess of the stoichiometric amount (preferably about 50%) of the alkaline reagent in order to assure efficient stripping within the shortest possible contact times. The aqueous alkaline stripping solutions used in the invention are fairly strong and usually contain between about 5 and 100 grams per liter (g/l) of the alkaline stripping reagent and fall within the range of about 0.5 N to about 2.5 N. By contacting the loaded organic solvent with the alkaline stripping agent, the organic soluble, aqueous insoluble platinum amine complexes are converted to aqueous soluble/organic insoluble platinum salts.

A common problem encountered in stripping platinum from loaded organic solvents containing platinum group metals is the formation of an insoluble scum believed to consist primarily of base metal impurities and result in poor phase separation. To solubilize the emulsion-forming scum, an amino carboxylic acid chelating agent (e.g., ethylenediaminetetraacetic acid (EDTA), or diethylenetriaminepentaacetic acid) is added to the strip solution, usually in the form of its sodium salt, prior to contact with the metal laden organic extract phase. The disodium salt of ethylenediaminetetaacetic acid (i.e., NaEDTA) is the preferred chelating agent for use in the instant process. The quantity of chelating agent required to solubilize the scums will vary depending upon the composition of a particular liquor, but will generally be equal to at least about 10% by weight of the alkaline reagent in the aqueous stripping solution. While addition of the chelating agent reduces the scum formation to trace levels and eliminates the physical problem of phase separation, analysis of the aqueous platinum strip solution revealed a corresponding increase in the quantity of palladium stripped along with platinum thereby reducing the platinum/palladium ratio in the strip solution. As an example, a loaded organic extract phase having a platinum/palladium ratio of 0.3 and stripped with an aqueous $NaHCO_3$ solution yielded an aqueous strip solution containing platinum and palladium in the ratio of 450/1 platinum/palladium. However, when the same solution of $NaHCO_3$ was used as the strippant in conjunction with a solution of sodium EDTA, the aqueous strip solution from the same loaded organic phase had a platinum/palladium ratio of 11/1. Hence, the use of a chelating agent (e.g., NaEDTA) in the stripping solution was found to increase the amount of palladium accompanying platinum into the aqueous strip solution. Accordingly, palladium is preferably stripped first from the loaded organic to a low level with an acidified reductant solution followed by platinum stripping using alkaline-NaEDTA solution.

Palladium is stripped from the loaded organic using a water soluble reducing agent in an acidified aqeous solution. An important criteria in selecting a suitable reductant reagent is that is should not contribute any foreign metals to the organic which might eventually cause fouling or a reduction in loading capacity. Satisfactory reductant stripping agents for use in the present invention include acidified solutions of hydrazine salts, hydroxylamine salts, and conventional organic reducing agents, i.e., thiourea. The reductant stripping solutions are acidified to between 0.1 to about 3 N HCl and are preferably employed as 0.5 N solutions. The preferred reducing solution is 50 g/l hydrazine dihydrochloride ($N_2H_4.2HCl$) acidified to 0.5 N HCl. Although suggested concentrations of strippant solutions have been described herein, those skilled in the art will appreciate that these may be varied depending upon the organic volumes to be treated, metal stripping efficiency of a particular strippant, to adjust the quantity and concentration of strip to yield solutions containing significant quantities of dissolved metal values and to avoid the handling of weak and/or large volumes of solution. The latter criteria is important because a significant advantage of the instant process lies in its use as a means of producing highly concentrated aqueous solutions of either platinum or palladium from aqueous leach liquors in which the metals are present at substantially lower concentrations.

The stripping contact time required for a given strippant solution will vary from one loaded organic to another depending upon the particular solvent system, the quantity of platinum or palladium sought to be stripped from the organic extract phase and the temperature at which the stripping operation is conducted. In most instances stripping contact times of between 1 and 10 minutes will strip on the order of about 90% or more of the respective metals from the loaded organic phase.

The invention is further illustrated in the following examples:

EXAMPLE I

This example illustrates that an organically substituted secondary amine may be used to selectively extract platinum and palladium from aqueous hydrochloric acid solutions also containing iron, iridium, ruthenium and rhodium.

An aqueous hydrochloric acid solution analyzing (in grams per liter) (g/l) platinum 0.40, palladium 3.30, iridium 1.10, rhodium 3.80, ruthenium 4.1 and iron 0.002 and having a measured emf of −525 millivolts was contacted and mixed with an extraction organic at an organic to aqueous (O/A) ratio of 1.5 to 1 for two minutes at 25° C to form an organic extract phase and an aqueous raffinate phase. Following phase disengagement, the aqueous and organic phases were separated and analyzed. The extraction organic utilized in this example contained 10 volume percent (%) Amberlite-LA-1, 3 volume percent (%) isodecanol and 87 volume percent (%) kerosene (as AMSCO 175) and was conditioned to the chloride form of the organic by two contacts with a solution of 200 g/l NaCl in 1N HCl at an O/A ratio of 2 to 1, followed by washing with a solution of 20 grams per liter NaCl adjusted to pH 1.5 with HCl. The results of the extraction are summarized in the following table.

TABLE 1

| Product | Amount in ml. | Assay, g/l | | | | | | Grams | |
|---|---|---|---|---|---|---|---|---|---|
| | | Pt | Pd | Ir | Rh | Ru | Fe | Pt | Pd |
| Aqueous feed | 1050 | 0.40 | 3.30 | 1.10 | 3.80 | 4.10 | 0.002 | 0.42 | 3.5 |
| Raffinate | 1050 | 0.04 | 1.00 | 1.10 | 3.78 | 4.05 | 0.002 | 0.04 | 1.1 |
| Loaded Organic | 1575 | 0.24 | 1.58 | 0.02 | 0.003 | 0.05 | 0.004 | 0.38 | 2.5 |

It will be seen from the above Table that platinum and palladium were selectively extracted from an aqueous hydrochloric acid solution containing iridium, rhodium, ruthenium and iron by an organically substituted secondary amine. The minute quantities of iridium, rhodium, ruthenium and iron which are extracted along with platinum and palladium are relatively insignificant.

EXAMPLE II

The tests in this Example illustrate that a variety of alkaline reagents at different concentrations may be used to selectively strip platinum from an organic extraction solvent loaded with platinum and palladium.

A ten percent (%) by volume Amberlite-LA-1 solution in kerosene (AMSCO 175) containing 3% by volume isodecanol (and conditioned to chloride form as in Example I) was loaded with platinum and palladium by contacting with an aqueous hydrochloric acid solution assaying (in g/l) gold 0.007, platinum 2.86, palladium 8.40, iridium 0.031, rhodium 0.038 and ruthenium 1.13. The loaded organic assayed in (g/l) platinum 1.12 and palladium 3.55. Predetermined quantities of the loaded organic were treated with solutions of $Na_2CO_3$, $NaHCO_3$ and NaOH in separatory funnels at room temperature (plus or minus 25° C) at an O/A ratio of 2 to 1. The contact times and alkaline concentration of the stripping solution were varied as noted in Table II. Following each contact period, the phases were separated, filtered and assayed for platinum distribution. Results of the respective assays are indicated in Tables II and IIA below.

Test No. 5. In all instances it was possible to obtain strip solutions in which platinum was at a relatively high concentration with respect to palladium as compared to the original aqueous solutions from which they were separated.

EXAMPLE III

The extraction and selective stripping tests in Example III were performed to illustrate that the sequence of stripping platinum and palladium from a loaded secondary amine organic is not important and either metal may be stripped first through the process of the present invention.

To carry out Example III a 10% by volume solution of Amberlite LA-1 in 3 volume percent (%) isodecanol and 87 volume percent (%) kerosene (AMSCO 175) was loaded with platinum and palladium in a single contact with a hydrochloric acid solution assaying (in g/l) gold 0.004, platinum 2.90, palladium 8.20, iridium 0.024, ruthenium 1.13 and rhodium 0.036. Prior to the

TABLE II

Loaded organic: 1.12 g/l Pt + 3.55 g/l Pd
Stripping: O/A = 2/1

| Test No. | Strip Solution | Volumes Taken, ml | | Contact | | Assays 1/ | | | | % Stripped | | "K" (concentration) O/A | | Ratio Pt/Pd in Strip |
|---|---|---|---|---|---|---|---|---|---|---|---|---|---|---|
| | | Organic | Aqueous | Time min | Temp °C | Strip Org.,g/l | | Strip Soln, g/l | | | | | | |
| | | | | | | Pd | Pd | Pt | Pd | Pt | Pd | Pt | Pd | |
| 1 | 50 g/l $Na_2CO_3$ | 30 | 15 | 5 | ±25 | 0.03 | 3.30 | 2.19 | 0.49 | 97 | 7< | 1 | 7 | 4.5/1 |
| 2 | 50 g/l NaOH | 30 | 15 | 5 | ±25 | 0.03 | 2.80 | 2.06 | 0.91 | 97 | 21< | 1 | 3 | 2/1 |
| 3 | 11 g/l $Na_2CO_3$ | 30 | 15 | 15 | ±25 | 1.17 | 3.45 | 0.007 | 0.002< | 1< | 1> | 100> | 100 | — |
| 4 | 50 g/l $NaHCO_3$ | 30 | 15 | 15 | ±25 | 0.18 | 3.52 | 1.80 | 0.004 | 84< | 1< | 1> | 100 | 450/1 |
| 5 | 50 g/l $NaHCO_3$ | 50 | 25 | 15 | ±40 | 0.25 | 3.52 | 1.80 | 0.038 | 78 | 1< | 1 | 93 | 47/1 |
| 6 | 50 g/l $NaHCO_3$ + 5 g/l NaEDTA 2/ | 30 | 15 | 15 | ±25 | 0.20 | 3.45 | 1.91 | 0.17 | 82 | 3< | 1 | 20 | 11/1 |
| 7 | 75 g/l $NaHCO_3$ + 5 g/l EDTA 3/ | 50 | 25 | 15 | ±25 | 0.21 | 3.40 | 1.87 | 0.18 | 81 | 4< | 1 | 19 | 10/1 |
| 8 | 50 g/l $NaHCO_3$ + 5 g/l EDTA | 50 | 25 | 15 | ±25 | 0.28 | 3.44 | 1.76 | 0.17 | 75 | 3< | 1 | 20 | 10/1 |

1/All assays were on filtered products and do not include losses, if any, in scum products.
2/NaEDTA = (Ethylenedinitrilo), tetra-acetic acid disodium salt.
3/EDTA = (Ethylenedinitrilo), tetra-acetic acid.

TABLE IIA

| Test No. | Physical Observations |
|---|---|
| 1 | Scum suspended thru aqueous. Poor phase separation. |
| 2 | Scum suspended thru aqueous. Poor phase separation. |
| 3 | Scum in aqueous, poor phase separation. |
| 4 | ( Scum suspended in aqueous, settles in |
| 5 | ( aqueous, clear organic. Same problem, ( both tests. |
| 6 | Trace scum, no phase separation problem. |
| 7 | Clear organic + aqueous phases, no scums. |
| 8 | Clear organic + aqueous phases, no scums. |

The results of the tests illustrated in Table II indicate that a variety of alkaline reagents can be used to selectively strip platinum from an amine organic loaded with platinum and palladium. The poor stripping action of Test No. 3 is attributable to use of a weak alkaline solution (11 g/l). The insoluble scums formed in Tests Nos. 1 through 5 resulted in poor phase separation. The emulsion forming scum was solubilized by addition of a chelating agent [NaEDTA (ethylene dinitrillo)tetraacetic acid disodium salt] to the alkaline stripping solution prior to contact with the loaded organic. As indicated in the results of Tests Nos. 6 through 8, this entirely eliminated the scum formation in most instances or reduced it to trace levels and also alleviated the physical problem of phase separation. A 50 g/l solution of $NaHCO_3$ provided optimum selective stripping of platinum from palladium as illustrated in the results of extraction of emf of the aqueous solution was reduced to −525 millivolts by the addition of hydroquinone. The extraction organic was preconditioned to chloride form by two contacts at an O/A ratio of 2 to 1 with 100 grams per liter NaCl in 1N HCl followed by washing with 20 grams per liter NaCl adjusted to pH 1.5 with HCl. The extraction was carried out by allowing the aqueous solution to contact the organic for three minutes at 24° C and at an O/A ratio of 2 to 1. Following the contact period the phases were separated and the loaded organic phase scrubbed by contacting with pH 1 HCL for three minutes at 24° C at an O/A ratio of 2 to 1. The phases were again separated and the scrubbed platinum and palladium loaded organic was analyzed, and assayed (in g/l) platinum 1.06, palladium 3.52, iridium 0.002, ruthenium 0.002 and rhodium less than 0.001. The loaded organic solution was then divided into three approximately equal portions (labeled organic 1, 2 and 3) which were each contacted once with an aqueous strip solution containing 50 g/l $NaHCO_3$ for a period of 5 minutes at 25° C. After contacting the first loaded organic portion, the phases were separated and sufficient $NaHCO_3$ added to the aqueous phase to restore it to 50 grams per liter $NaHCO_3$, and the restored solution used to contact the second and third portions of loaded organic in sequence. All contacts were carried out at an O/A ratio of 2 to 1 and the phases separated and analyzed after each contact. The platinum pregnant aqueous strip solution was then acidified to pH 1 with 12N HCl. Analyses of the scrubbed-loaded organic, each stripped organic portion and the acidified platinum pregnant strip solution were carried out and the results found to be as follows:

TABLE III

| Product | Amount ml | O/A | Assay, g/l | | | | | | Grams | |
|---|---|---|---|---|---|---|---|---|---|---|
| | | | Au | Pt | Pd | Ir | Ru | Rh | Pt | Pd |
| Scrubbed organic | 1400 | | 0.005 | 1.06 | 3.52 | 0.002 | 0.002 | <0.001 | 1.48 | 4.9 |
| Stripped organic 1 | 440 | 2.0 | | 0.05 | 3.52 | | | | 0.02 | 1.5 |
| Stripped organic 2 | 470 | ↓ | | 0.06 | 3.52 | | | | 0.03 | 1.6 |
| Stripped organic 3 | 490 | | | 0.09 | 3.52 | | | | 0.04 | 1.7 |
| Pt pregnant strip (acidified) | 232 | | 0.002 | 6.00 | 0.004< | 0.001 | 0.001 | <0.001 | 1.39< | 0.001 |
| | | | | | | | | | 1.48 | 4.8 |
| % stripped | | | | Pt 94 | Pd 0.03 | | | | | |

Ratio Pt/Pd in pregnant strip = 1000/1

Table III indicates that 94% of the platinum was stripped from the loaded organic while less than 0.03% of the palladium was removed. The ratio of platinum to palladium in the pregnant strip solution was greater than 1,000 to 1. Platinum stripped organic portions (Nos. 1, 2 and 3) were combined and assayed (in g/l) platinum 0.070 and palladium 3.48. The platinum stripped organic was then scrubbed with 1N HCl for 3 minutes at 25° C at an O/A ratio of 2 to 1. After phase separation, the scrubbed organic phase was analyzed and found to assay (in g/l) platinum 0.070 and palladium 3.50. The scrubbed organic was then contacted three times in succession with a fresh solution of 50 g/l $N_2H_4.2HCl$ in 0.5N HCl at an organic aqueous ratio of 2 to 1 for a period of 5 minutes, the phases being separated after each contact. The separated aqueous strip solutions were combined and an analysis of the aqueous strip solution revealed that 75% of the palladium present in the scrubbed organic and less than 2% of the platinum had been stripped into the aqueous solution by the acidic strip treatment.

The results of this test indicate that an organically substituted secondary amine organic loaded with platinum and palladium may be selectively stripped from a loaded secondary amine organic in a stripping sequence in which platinum is first removed followed by palladium.

EXAMPLE IV

This test was conducted to illustrate that platinum and palladium may be stripped from a loaded secondary amine organic in the order (1) palladium, (2) platinum.

An organic extraction solution was prepared and preconditioned to chloride form as in Example III and used to contact an aqueous hydrochloric acid solution assaying (in g/l) gold less than 0.001, platinum 1.70, pallaadium 4.59, iridium 0.025, ruthenium 1.10, and rhodium 0.036. The emf of the aqueous solution was reduced to −525 millivolts by the addition of dry hydroquinone prior to contacting the extraction organic. A single organic/aqueous contact was then carried out for three minutes at 25° C at an O/A ratio of 1/1. Following phase separation the organic extract phase was scrubbed by contacting pH 1 HCl for three minutes at an organic to aqueous ratio of 2 to 1. Analysis of each of the respective phases gave the following results.

TABLE IV

| Product | Amount ml | O/A | Assay,g/l | |
|---|---|---|---|---|
| | | | Pt | Pd |
| Aqueous | 850 | | 1.70 | 4.59 |

TABLE IV-continued

| Product | Amount ml | O/A | Assay,g/l | |
|---|---|---|---|---|
| | | | Pt | Pd |
| Raffinate | 850 | 1.0 | 0.70 | 1.70 |
| Loaded Organic | 850 | | 1.04 | 2.60 |
| Aqueous Scrub | 412 | 2.0 | 0.009 | 0.02 |
| Scrubbed Organic | 825 | | 1.04 | 2.60 |

The scrubbed loaded organic (assaying in g/l) platinum 1.04 and palladium 2.60 was then subdivided into two separate portions. The first portion was contacted with a 50 g/l aqueous solution of $N_2H_4.2$ HCl acidified to 0.5N with HCL for 3 minutes at an O/A ratio of 2 to 1. Following phase separation the aqueous raffinate phase was used to contact the second portion of scrubbed organic (at an O/A ratio 1.5 to 1) for 3 minutes at 25° C. The palladium pregnant aqueous raffinate was separated from the organic extract phase which was then combined with the previously stripped first organic portion. As in the initial test, the percentages and amounts of platinum and palladium stripped were determined by analysis of the respective separated phases as indicated in the following table:

TABLE IVA

| Product | Amount ml | Assay,g/l | | Grams | | % Stripped | |
|---|---|---|---|---|---|---|---|
| | | Pt | Pd | Pt | Pd | Pt | Pd |
| Scrubbed organic stripped Combined | 700 | 1.04 | 2.60 | 0.728 | 1.82 | | |
| Pd/organic | 700 | 1.00 | 0.56 | 0.700 | 0.39 | <1 | 78 |
| Pd pregnant strip | 200 | 0.10 | 6.90 | 0.020 | 1.38 | | |
| | | | | 0.720 | 1.77 | | |

The combined palladium stripped organic was then contacted with pH 1 HCl at an O/A ratio of 2 to 1 for 3 minutes at 25° C to scrub the organic phase. Following phase separation, the scrubbed organic phase was analyzed and found to assay (in g/l) platinum 1.00, and palladium 0.56. The scurbbed organic phase was then contacted with a 50 g/l solution of $NaHCO_3$ containing 5 g/l EDTA which was prepared by adjusting an EDTA suspension in water to pH 8 with NaOH solution to dissolve the EDTA, adding $NaHCO_3$ and diluting with water to final volume. The organic was divided into two equal aliquots. The first aliquot was contacted with the alkaline stripping solution for 10 minutes at 25° C. Following phase separation, 5.1 grams of $NaHCO_3$ was dissolved in the aqueous phase to restore the alkaline solution to 50 g/l $NaHCO_3$. The restored strippant solution was then used to contact the second aliquot for 10 minutes at 25° C. Both of the preceding contacts were carried out at an organic to aqueous ratio of 2 to 1. No scum was observed during the first contact and only trace scums were apparent at the interface of the second stripping contact. After phase separation following the second stripping contact, the stripped organic phases were combined and the platinum pregnant strip solution was adjusted to pH 1 by addition of 12N HCl to stabilize the solution. As in the preceding test, the percentage of platinum and palladium stripped was determined by analysis of the separated phases as indicated below:

TABLE IVB

| Product | Amount ml | Assay, g/l | | Grams | | % Stripped | |
|---|---|---|---|---|---|---|---|
| | | Pt | Pd | Pt | Pd | Pt | Pd |
| Pd stripped organic (scrubbed) | 600 | 1.00 | 0.56 | 0.60 | 0.336 | | |
| Pt stripped organic | 600 | 0.15 | 0.55 | 0.09 | 0.330 | 85 | <2 |
| Pt pregnant strip | 151 | 3.20 | 0.071 | 0.48 | 0.011 | | |
| | | | | 0.57 | 0.341 | | |

The tabulated data indicate that the initial stripping operation resulted in the strip of 78% of the palladium and less than 1% of the platinum from the loaded organic. The Palladium containing aqueous strip solution had a palladium/platinum ratio of 69/1. The platinum stripped organic contained 0.15 g/l platinum and 0.55 g/l platinum (85% and less than 2% stripped, respectively) and the aqueous platinum containing strip solution had a platinum/palladium ratio of 46/1. Compared to the starting feed liquor of the process, the Pd/Pt ratio was increased from 2.7/1 to 69/1 and the Pt/Pd ratio was increased from 0.4/1 to 46/1. Overall recovery from the loaded organic was 85% for platinum and 79% for palladium.

The platinum and palladium values may be won from the respective aqueous stripping solutions using techniques well known in the art (e.g., precipitation of ammonium chloroplatinate with NH$_4$Cl to recover platinum, or precipitation of dichlorodiaminopalladium by sequential addition of ammonium hydroxide and hydrochloric acid solutions to recover palladium).

What is claimed is:

1. A process for the separation and selective recovery of platinum and palladium values from an aqueous acidic medium which comprises:

contacting the medium with a mixed organic extraction reagent comprising a water immiscible solvent having dissolved therein an organically substituted secondary amine compound of the general formula:

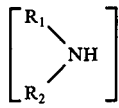

wherein $R_1$ and $R_2$ are hydrocarbon groups and $R_1$ + $R_2$ contain between 18 and 35 carbon atoms, said compound being sufficiently soluble in said solvent to make a 1% solution and capable of forming complexes with platinum and palladium that are preferentially soluble in said solvent and whereby said contacting results in the formation of an organic extract phase and an aqueous raffinate phase, maintaining said medium at an emf of between about −425 and −650 millivolts during said contacting operation, separating said organic extract phase from said aqueous raffinate phase, contacting said organic extract phase with an acidified aqueous solution of a water soluble reducing agent to form an aqueous phase loaded with palladium and a platinum containing organic extract phase, separating said platinum containing organic phase from said palladium containing aqueous phase, contacting said platinum containing organic extract phase with at least the stoichiometric quantity of an aqueous alkaline stripping agent required for neutralization of said extract phase, said contact resulting in the formation of an aqueous phase loaded with platinum and a stripped organic phase.

2. The process of claim 1 wherein $R_1$ is a fatty alkyl group.

3. The process of claim 1 wherein said aqueous acidic medium is hydrochloric acid.

4. The process according to claim 3 wherein said alkaline solution contains between about 5 and 100 grams per liter of an alkaline reagent.

5. The process of claim 4 wherein said alkaline reagent is a water soluble member selected from the group consisting of the carbonates, bicarbonates and hydroxides of alkali and alkaline earth elements.

6. The process of claim 5 wherein a metal chelating agent is added to said aqueous alkaline solution prior to contacting said organic extract phase.

7. The process of claim 6 wherein said metal chelating agent is an amino carboxylic acid compound.

8. The process of claim 1 wherein said reducing agent is selected from the group consisting of acidified solutions of hydrazine salts, hydroxylamine salts, and thiourea.

9. The process of claim 8 wherein said acidified reducing agent is hydrazine dihydrochloride.

10. The process of claim 9 wherein said acidified reducing solution is adjusted to between 0.1 and 3.0 N HCl.

11. The process of claim 3 wherein said aqueous solution is extracted in plurality of times by contacting the aqueous raffinate phase and subsequent raffinates with said organic extractant.

12. A continuous process for the selective separation and recovery of platinum and palladium dissolved in an aqueous chloride solution which comprises:

reducing said solution to an emf between about −425 mv and −650 mv, contacting said aqueous chloride solution with a mixed extraction reagent comprising a water immiscible organic solvent having dissolved therein an organically substituted secondary amine compound of the general formula:

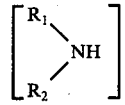

wherein $R_1$ and $R_2$ are hydrocarbon groups and $R_1$ + $R_2$ contain between 18 and 35 carbon atoms, said compound having a solubility of at least 1% in said solvent and being capable of forming complexes of platinum and palladium that are preferentially soluble in the organic solvent and whereby the contacting results in the creation of an organic extract phase and an aqueous raffinate phase, separating said organic extract phase from said aqueous raffinate phase, contacting said organic extract phase with an aqueous solution containing at least the stoichiometric quantity of sodium bicarbonate required for neutralization of said organic phase and the disodium salt of ethylenediaminetetraacetic acid to form a stripped organic extract phase and an aqueous platinum containing strip solution, contacting said stripped organic extract phase with an aqueous solution containing from about 5 to about 100 grams per liter of hydrazine dihydrochloride to remove palladium from said stripped organic extract phase, and contacting a fresh platinum and palladium containing aqueous chloride solution with said platinum and palladium stripped organic extract phase.

13. A continuous process for the separation and selective recovery of platinum dissolved in aqueous chloride solutions with palladium which comprises:

reducing said aqeuous chloride solution to an emf between about −425 mv and −650 mv, contacting said aqueous chloride solution for a predetermined time period with an organic solvent containing at least 1% by weight of an organically substituted secondary amine compound of the general formula

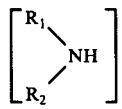

wherein $R_1$ and $R_2$ are hydrocarbon groups and $R_1 + R_2$ contain between 18 and 35 carbon atoms, said compound having a solubility of at least 1% in said solvent and being capable of forming complexes of platinum and palladium that are preferentially soluble in the organic solvent and whereby the contacting results in the creation of an organic extract phase and an aqueous raffinate phase, isolating said extract phase from said raffinate phase, contacting said extract phase with at least the stoichiometric quantity of an aqueous alkaline solution required to neutralize the chloride form of said amine to selectively separate said platinum values from said palladium values in said organic extract phase, and form a platinum stripped organic extract phase and an aqueous platinum containing strip solution, and isolating said aqueous solution from said platinum extract phase.

14. A continuous process for the separation and selective recovery of palladium dissolved in aqueous chloride solutions with platinum which comprises:

reducing said solution to an emf between about −425 mv and −650 mv, contacting said aqueous chloride solution for a predetermined time period with an organic solvent containing at least 1% by weight of an organically substituted secondary amine compound of the general formula:

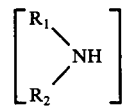

wherein $R_1$ and $R_2$ are hydrocarbon groups and $R_1 + R_2$ contain between 18 and 35 carbon atoms, said compound capable of forming complexes of platinum and palladium that are preferentially soluble in the organic xolvent and whereby said contacting results in the creation of an organic extract phase and an aqueous raffinate phase, separating said organic extract phase from said aqueous raffinate phase, contacting said organic extract phase with an aqueous solution containing a reducing agent acidified to between about 0.1 to about 3.0 N-HCl to strip palladium values from said organic extract phase, said contact resulting in the formation of a palladium loaded aqueous phase and a stripped organic phase containing said platinum, separating said loaded aqeuous phase and said stripped organic phase, and recovering palladium from said loaded aqueous phase.

* * * * *